United States Patent [19]

Hsiao

[11] Patent Number: 5,152,153

[45] Date of Patent: Oct. 6, 1992

[54] AIR-CONDITIONER/REFRIGERATOR COOLING WATER CIRCULATING SYSTEM WITH UNDERGROUND HEAT DISSIPATING AND HOT WATER RECOVERY SUB-SYSTEM

[76] Inventor: Zu C. Hsiao, 2F., No. 192, Der Hui St., Taipei, Taiwan

[21] Appl. No.: 685,514

[22] Filed: Apr. 15, 1991

[51] Int. Cl.⁵ .............................................. F25D 23/12
[52] U.S. Cl. ........................................ 62/260; 165/45
[58] Field of Search .................. 62/260, 238.1; 165/45

[56] References Cited

U.S. PATENT DOCUMENTS

| | | | |
|---|---|---|---|
| 2,749,724 | 6/1956 | Borgerd et al. | 62/260 |
| 3,658,123 | 4/1972 | Root | 165/45 |
| 3,965,694 | 6/1976 | Vignal et al. | 62/260 |
| 4,448,238 | 5/1984 | Singleton, Jr. et al. | 62/260 |

Primary Examiner—Albert J. Makay
Assistant Examiner—William C. Doerrler
Attorney, Agent, or Firm—Bucknam and Archer

[57] ABSTRACT

An air-conditioner/refrigerator water circulating system, comprising a water recovery pipe system to collect cooling water from a cooling water pipe system which circulates through the condensing pipes of a plurality of air-conditioners/refrigerators to carry heat therefrom, a water recovery tank to collect water recovered from said water recovery pipe system, a cooling coil embedded under the ground to cool down water from said water recovery tank, a supplementary water tank to receive water from said cooling coil, and a water raising device to automatically pump water from said supplementary water tank to said cooling water pipe system for repeated circulation.

1 Claim, 1 Drawing Sheet

AIR-CONDITIONER/REFRIGERATOR COOLING WATER CIRCULATING SYSTEM WITH UNDERGROUND HEAT DISSIPATING AND HOT WATER RECOVERY SUB-SYSTEM

BACKGROUND OF THE INVENTION

The present invention relates to air-conditioner/refrigerator cooling water circulating system with underground heat dissipating and hot water recovery sub-system and relates more particularly to such an air-conditioner/refrigerator cooling water circulating system with underground heat dissipating and hot water recovery sub-system which collects cooling water that circulates through the condensing pipes of various air-conditioners or refrigerators in every floor of a high-rise building and dissipates the heat in water underground for further repeated circulation to continuously cool down said condensing pipes.

In regular air-conditioners/refrigerators, discharged heat may be dissipated either through the air cooling or the water cooling method. In the air cooling method, heat is directly discharged in the air. However, the cooling method is not suitable for large scale air-conditioners/refrigerators because it consumes too much power, produces a high noise level and has low efficiency in heat dissipation. In order to ensure a high cooling rate, water-cooled air-conditioning systems are commonly used in high-rise buildings. In a water-cooled air-conditioning system, cooling water circulates through the condenser coil to carry heat away. After heat absorption, hot water from the condenser coil is sent to a cooling tower, which is generally mounted on the roof of a building for cooling the water, for further repeated circulation. Because the cooling tower is mounted on the roof of a building, heat dissipating efficiency will decrease during use hot summer season and is affected the performance of the whole system. Further, a conventional water cooled air-conditioning system will also produce loud noise during its operation and discharged hot air may cause secondary pollution.

The present invention has been accomplished to avoid the drawbacks mentioned hereinabove. It is therefore the main object of the present invention to provide an air-conditioner/refrigerator cooling water circulating system which dissipates heat underground so as to provide high performance at a low noise level.

DETAILED DESCRIPTION OF THE PREFERRED EMBODIMENT

Figure 1:
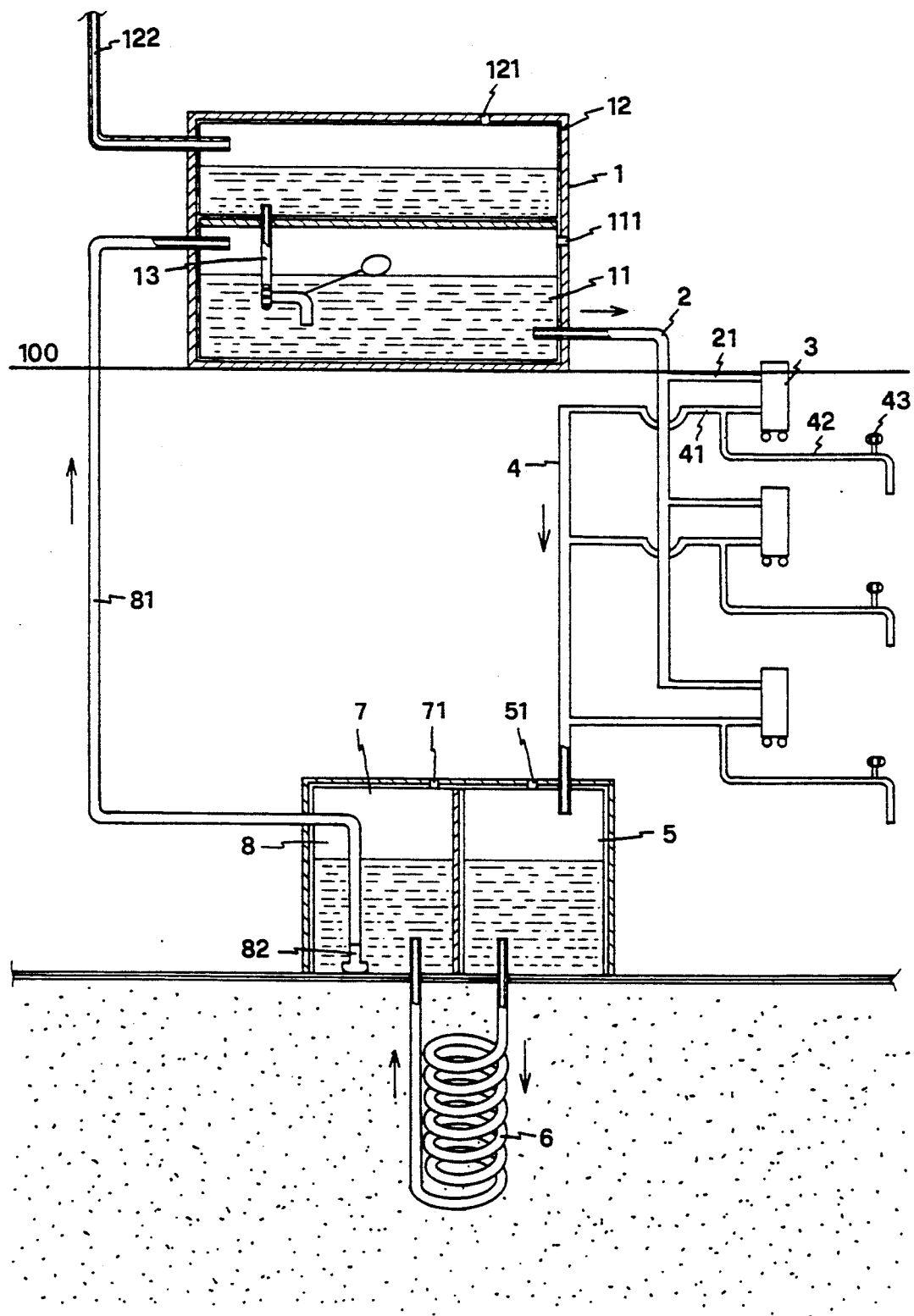
FIG. 1 is a drawing illustrating schematically the preferred embodiment of the air-conditioner/refrigerator cooling water circulating system with underground heat dissipating and hot water recovery sub-system of the present invention.

Turning now to the annexed drawing in greater detail, there is provided a substantially enclosed water supply tank 1 mounted on the roof 100 of a building and comprised of two water chambers separated from each other, namely the upper water chamber 12 and the lower water chamber 11. A water pump 13 and a water supply device 14 are controlled by a water level controller to supply water from the upper water chamber 12 to the lower water chamber 11 when the water level in the lower water chamber 11 is below a fixed lower limit. The upper and lower water chambers 12 and 11 have each a vent hole 121 or 111 at a higher and suitable location for ventilation. The upper water chamber 12 is further connected to a water supply source by a water intake pipe 122. The lower water chamber 11 has a cooling water pipe system 2 attached thereto at one end which cooling water pipe system 2 has a plurality of manifold pipes 21 respectively connected between a plurality of air-conditioners 3 and a recovery pipe system 4. Through the cooling water pipe system 2, cooling water from the lower water chamber 11 of the water supply tank 1 is circulated through the condensing pipes of the air-conditioners 3 to carry heat by flow of water from the air-conditioners to a substantially enclosed water recovery tank 5 through the recovery pipe system 4. The recovery pipe system 4 comprises a plurality of recovery manifold pipes 41 to collect water from the condensing pipes of the air-conditioners 3, which recovery manifold pipes 41 further comprise each a water outlet pipe 42 controlled by a water tap 43. As shown in the annexed drawing, the water recovery tank 5 has a vent hole 51 at a suitable location for ventilation. A supplementary water tank 7 which has a vent hole 71 at a suitable location is provided to receive water collected from the water recovery tank 5 via a cooling coil 6. The cooling coil 6 is a coiled pipe made from corrosion-resisting material and embedded underground, having one end connected to the water recovery tank 5 and the opposite end connected to the supplementary water tank 7. A water raising device 8 is fastened in the supplementary water tank 7 to send water from the supplementary water tank 7 to the lower water chamber 11 of the water supply tank 1. The water raising device comprises a suction pump 82 controlled by a water level controller to automatically pump water from the supplementary water tank 7 to the lower water chamber 11 of the water supply tank 1 through a water outlet pipe 81 for further circulation.

What is claimed is:

1. An air-conditioner/refrigerator water circulating system comprising:
    a water supply tank mounted on the roof of a building, said building having a plurality of air-conditioners and refrigerators in each floor of said building, said system consisting of a first water chamber at an upper position and a second water chamber at a lower position separated from said first water chamber by a dividing wall and sharing side walls, said first and second water chamber having each a vent hole for ventilation and being connected through a water supply device, said first water chamber receiving cooling water from a water supply source;
    a cooling water pipe system connected to said second water chamber at one end thereof and comprising a plurality of cooling manifold pipes respectively connected to the condensing pipes of said air-conditioners and refrigerators in each floor of said building, said cooling manifold pipes including each a water outlet pipe attached with a water tap for flow control, said water tap being located on said water outlet pipe;
    a water recovery pipe system comprising a main water recovery pipe connected to said condensing pipes through a plurality of recovery manifold pipes to collect water from said cooling water pipe system;

an enclosed water recovery tank to receive water from said main water recovery pipe, having a vent hole at the top;

a cooling coil made from coiled, corrosion-resisting pipe and embedded underground to drop the temperature of water from said water recovery tank;

a supplementary water tank to receive water from said cooling coil, having a vent hole for ventilation;

a water raising device comprising a suction pump controlled by a water level controller in said supplementary water tank to pump water from said supplementary water tank to said second water chamber of said water supply tank.

* * * * *